United States Patent [19]

McFarland

[11] 3,843,791
[45] Oct. 22, 1974

[54] METHOD OF KILLING INSECTS WITH QUINAZOLINONES AND QUINAZOLINE-THIONES

[75] Inventor: James W. McFarland, Lyme, Conn.

[73] Assignee: Pfizer Inc., New York, N.Y.

[22] Filed: Jan. 11, 1973

[21] Appl. No.: 322,892

[52] U.S. Cl..................... 424/251, 424/46, 424/47, 424/357
[51] Int. Cl............................................. A01n 9/22
[58] Field of Search..................................... 424/251

[56] References Cited
UNITED STATES PATENTS
3,567,827   3/1971   Stearns ............................... 424/251
3,755,581   8/1973   Janiak ................................. 424/251

Primary Examiner—Albert T. Meyers
Assistant Examiner—Dale R. Ore
Attorney, Agent, or Firm—Connolly & Hutz

[57] ABSTRACT

2-Substituted-4(3H)-quinazolinones and -4(3H)-quinazoline-thiones, prepared by acylation of the appropriate anthranilic acid or anthranilamide and cyclization of the intermediates, followed by treatment with phosphorous pentasulfide for the synthesis of the quinazolinethiones, as insecticides.

20 Claims, No Drawings

METHOD OF KILLING INSECTS WITH QUINAZOLINONES AND QUINAZOLINE-THIONES

BACKGROUND OF THE INVENTION

This invention relates to 2-substituted-4-(3H)-quinazolinones and -4(3H)-quinazolinethiones as insecticides.

Since antiquity, efforts have been made to minimize the costly and harmful effects of insects; in 1892, arsenate salts were used to combat the gypsy moth; Paris green was employed by the Plains settlers in 1869 to protect potatoes from Colorado potato beetle; and in 1900 nicotine was commonly used as an insecticide in Great Britain. By the 1940's DDT and other halogenated hydrocarbons received wide attention in combatting insects, and more recently organophosphates and carbamates have been used as insecticides. Undesirable toxid effects to other animals coupled with the development of resistance to these agents by many species of insects has prompted a continued search for other insecticides.

A limited series of quinazolines including 4-ethylamino-, 4-diethylamino-, 2-chloro-4-ethylamino- and 2-chloro-4-diethylaminoquinazoline are claimed as plant-growth regulators, British Pat. No. 822,069. In 1964–1965, Deysson, et al., *Compt. Rend.*, 259 (2), 479 (1964), *Ann. Pharm. Franc.*, 23, 163, 229 (1965), reported the antimimotic properties of 1-methyl-1,4-dihydro-, 1-propyl-1,4-dihydro, 3-methyl-3,4-dihydro-, 3-ethyl-3,4-dihydro-, 3-propyl-3,4-dihydro-, and 3-isopropyl-3,4-dihydro-4-quinazolines. U.S. Pat. No. 3,244,503 discloses a series of 3-alkyl and cycloalkyl substituted 2,4(1H, 3H)-quinazolinediones, useful as herbicides.

F. I. Abezgauz, et al., *Zh. Obshch. Khim.*, 34 (9), 2965 (1964) (*C.A.* 61, 15996g), describes the synthesis of 2-fluoromethylquinazol-4-one, and Dymek, et al., *Dissertationes Pharm.*, 16 (3), 247 (1964), (*C.A.* 63, 11561c), the corresponding 2-chloromethyl analog. In both cases no utility was disclosed.

R. F. Smith, et al., *J. Org. Chem.*, 30, 1312 (1965), describes the chlorination of 2-methyl- and 2-ethylquinazol-4-one employing a phosphorous tri- and pentachloride mixture wherein 2-trichloromethyl- and 2-(1,1-dichloroethyl)-4-chloroquinazoline are formed respectively. W. L. Armarego, et al., *J. Chem. Soc.*, 234 (1966) reports the preparation of a limited number of substituted quinazolines including the 2-trifluoromethyl analog thereof. Both groups of investigators failed to disclose a specific utility for their compounds.

More recently, Japanese Pat. No. 7,124,029 claims a series of 1-substituted-4-(1H)-quinazolinones as antitussive, antirheumatic and antiinflammatory agents, while Japanese Pat. No. 7,124,030 claims 2,3-disubstituted-4(3H)-quinazolinones as tranquillizers, anticonvulsants and hypotensives.

The 2-substituted-4(3H)-quinazolinone and -thione insecticides of the present invention are previously claimed as herbicides in the published German Pat. application No. 2,134,263 and in pending U.S. application Ser. No. 234,372 filed Mar. 13, 1972.

SUMMARY OF THE INVENTION

It has now been discovered that quinazolinones and quinazolinethiones of the formulae:

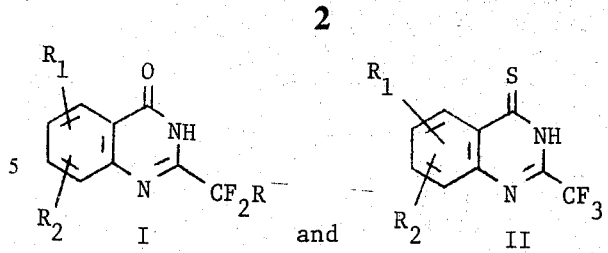

and the alkali metal and alkylamine salts thereof, where R is selected from the group consisting of H, F, Cl, perfluoroalkyl containing from 2 to 4 carbon atoms and —CXYZ where X, Y and Z are each H, F or Cl; $R_1$ is selected from the group consisting of H, F, Cl, Br, I and $CF_3$; and $R_2$ is selected from the group consisting of H, F, Cl, Br, I and $NO_2$ have unexpected utility as insecticidal agents.

The preferred compounds of the present invention include those of formula I wherein $R_1$ is selected from the group consisting of H, F, Cl, Br, I and $CF_3$ and $R_2$ is 6–Cl.

A second preferred class are those related to I wherein $R_1$ is H, F, Cl, Br, I or $CF_3$ and $R_2$ is 6–Br.

A third group of preferred compounds are those of formula I wherein $R_1$ is H, F, Cl, Br, I or $CF_3$ and $R_2$ is 6–$NO_2$.

A fourth class of preferred insecticides are those of formula II wherein $R_1$ is 6–Cl.

Also considered within the scope of the present invention are congeners of formulae I and II wherein $R_1$ and $R_2$ are each lower alkyl, lower alkoxy or cyano. Also anticipated are congeners of formulae I and II having in addition to substituents $R_1$ and $R_2$, a third substituent, $R_3$, comprising an organic radical usually found substituted on aromatic nuclei.

As previously mentioned, the aforesaid compounds have been found to be extremely effective in killing mites.

DETAILED DESCRIPTION OF THE INVENTION

The substituted 4(3H)-quinazolinones of formula I can readily be prepared by any one of two synthetic procedures. One method involves the conversion of a substituted anthranilic acid, usually with a carboxylic acid anhydride, $(RCF_2CO)_2O$, in the presence of a tertiary amine to the intermediate 2-substituted-4H-3,1-benzoxazin-4-one. Any tertiary amine can be used provided that it will not react with the acid anhydride. Generally, trialkyl amines, e.g., triethyl amine or pyridine, are preferred. The 2-substituted-4-H-3,1-benzoxazin-4-one intermediate is dissolved in an anhydrous, inert solvent such as chloroform and converted to the corresponding 4(3H)-quinazolinone with ammonia. The solvent is evaporated, the desired product isolated by conventional means from the small amounts of acylanthranilamide that are formed, and purified by crystallization. The carboxylic acid anhydride may be replaced with the appropriate acyl halide, preferably the acid chloride. The reaction may be conducted in any anhydrous, inert solvent. The preferred solvents are tetrahydrofuran, ethyl acetate, 1,4-dioxane or chloroform.

Although the basicity of the ammonia is usually adequate to effect cyclization of the intermediate acylanthranilamide, to insure completeness of this conversion the reaction solvent can be removed in vacuo and the residue treated with a dilute aqueous solution of sodium or potassium hydroxide. The desired product is isolated by acidification of the basic solution, followed by filtration of the precipitated solid.

In the alternate method of preparation, the corresponding anthranilamide is acylated in said inert solvent with an acyl halide, preferably the chloride, in the presence of a tertiary amine, such as pyridine, to give, as an intermediate, the 2-acylaminobenzamide. Heating the latter product either neat or in an inert solvent, or on treatment with 1N sodium hydroxide solution causes it to cyclize to the desired substituted 4(3H)-quinazolinone. Alternately, the acyl anhydride or acid can be employed for the acylation. The reaction utilizing the acid halide or anhydride is preferably conducted in an anhydrous, inert solvent such as one of those listed above, while the acylation using the acid is carried out neat.

The requisite anthranilic acids, anthranilamides and acyl halides used as starting materials in preparing the novel compounds of the present invention are readily prepared by conventional methods well known to those skilled in the art, e.g., according to the methods of Baker, et al., *J. Org. Chem.*, 17, 149 (1952) and Sadler, et al., *J. Am. Chem. Soc.*, 78, 1251 (1956).

The corresponding 2-trifluoromethyl-4(3H)-quinazolinethiones of formula II are readily obtained from the oxygen analogs above by heating the latter compounds with phosphorous pentasulfide in pyridine. The products are then isolated and purified by standard techniques.

Because of the presence of the labile hydrogen atom on the 3-nitrogen atom, the 4(3H)-quinazolinones and 4(3H)-quinazolinethiones are weakly acidic and form salts with inorganic bases such as the alkali metal carbonates and hydroxides, as well as organic bases such as mono-, di- and trialkylamines wherein said alkyl contains from 1 to 12 carbon atoms.

The compounds of the present invention have been found to be highly effective insecticides and may be applied directly to the insect, to their environment, or hosts susceptible to insect attack. The preferred compounds for this unexpected utility are 2,8-bis(trifluoromethyl)-6-chloro-4(3H)-quinazolinone, 2-chlorodifluoromethyl-6-chloro-8-trifluoromethyl-4(3H)-quinazolinone, 2-pentafluoroethyl-6,8-dichloro-4(3H)-quinazolinone, 2-trifluoromethyl-6,8-dichloro-4(3H)-quinazolinone, 2-pentafluoroethyl-6-chloro-8-trifluoromethyl-4(3H)-quinazolinone, 2-chlorodifluoromethyl-6-bromo-8-trifluoromethyl-4(3H)-quinazolinone, 2-pentafluoroethyl-6-bromo-4(3H)-quinazolinone, 2-trifluoromethyl-6bromo-4(3H)-quinazolinone, 2-trifluoromethyl-6,8-dibromo-4(3H)-quinazolinone, 2-pentafluoroethyl-6-bromo-7-chloro-4(3H)-quinazolinone, 2,8-bis(trifluoromethyl)-6-nitro-4(3H)-quinazolinone, 2-pentafluoroethyl-6-nitro-4(3H)-quinazolinone, 2-trifluoromethyl-6,8-dichloro-4-(3H)-quinazolinethione and 2-trifluoromethyl-4-(3H)-quinazolinethione.

The compounds described herein are only slightly water-soluble. For water-soluble forms of the subject insecticides it is desirable to use salts thereof, preferably the alkali metal or alkylamine salts. Often, the alkylamine salts of the herein described insecticidal agents are more soluble in organic solvents than the free acid.

The insecticides of the instant invention or the aforementioned salts thereof can be applied per se, as solids or in vaporized form, but are preferably applied as the toxic components in insecticidal compositions of the compound or salt thereof and a carrier. The compositions can be applied as dusts, as liquid sprays, or as gas-propelled sprays and can contain, in addition to a carrier, additives such as emulsifying agents, wetting agents, binding agents, odorants, stablizers and the like.

A wide variety of liquid and solid carriers can be employed in the insecticidal compositions; for example, liquid carriers can include water; organic solvents such as alcohols, ketones, amides, esters and aromatic hydrocarbons; mineral oils such as kerosene, light oils and medium oils; and vegetable oils such as cottonseed oil. Solid carriers include talc, bentonite, diatomaceous earth, pyrophyllite, fullers earth, gypsum, flours and various natural and synthetic clays. In addition, these formulations may contain other compatible pesticides, plant growth regulators, fillers or attractants.

The concentration of active ingredient to be used with inert carriers, either solid or liquid carriers, will depend upon many factors, such as the particular compound which is used, the carrier in or upon which it is incorporated, the insect species to be controlled and the like, the proper consideration of these factors being within the skill of those versed in the art. In general, the insecticides of this invention will be effective in concentrations from about 0.0001 weight percent to as much as 20 weight percent. A weight percent of 0.05 for the insecticides of the present invention in either a liquid or solid carrier is preferred.

The terms "insecticide" and "insect" as employed herein refer to their broad and commonly understood usage rather than to those creatures which in the strict biological sense are classified as insects. Thus, the term "insect" is used not only to include small invertebrate animals belonging to the class *Insecta*, but also to the other related classes of anthropods whose members are segmented invertebrates having more or fewer than six legs, such as spiders, mites, ticks, centipedes, worms and the like.

The following examples are provided to illustrate further the scope of the present invention, and should not be construed as limitations thereof.

EXAMPLE 1

2-Trifluoromethyl-6-bromo-4(3H)-quinazolinone (I: R = F; $R_1$ = H: $R_2$ = 6–Br)

To an ice cold solution of 9.0 g. (0.0415 mole) of 5-bromoanthranilic acid, 6.5 g. (0.093 mole) of dry pyridine, and 100 ml. of chloroform, is added slowly 17.5 g. (0.093 mole) of trifluoroacetic anhydride. The solution is heated at reflux for 1.5 hours, cooled, and the solution evaporated to dryness. The residue is redissolved in 100 ml. of fresh chloroform and the resulting solution saturated with ammonia. After 30 minutes, the chloroform is evaporated again and the resulting solid triturated with 1N HCl to give 8.0 g. of a solid melting at 240°–250° C. The solid is treated with 25 ml. of 1N sodium hydroxide and filtered. The solid which does not dissolve is the corresponding acylanthranilamide. The filtrate is acidified to give 6.5 g. of the desired product as a colorless solid melting at 250°–255° C. Recrystallization from chloroform gives 4.5 g. of product, melting point 253°–255° C.

Anal. Calc'd for C₉H₄BrF₃N₂O: C, 36.9; H, 1.37; N, 9.58.
Found: C, 37.0; H, 1.48; N, 9.49.

Using the above procedure, and starting with the appropriate carboxylic acid anhydride and anthranilic acid, the substituted 4(3H)-quinazolinones indicated are prepared.

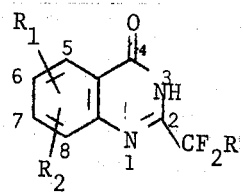

| R | R₁ | R₂ | M.P., °C. |
|---|----|----|-----------|
| F | H | 7-NO₂ | 205-206 |
| F | H | 7-Cl | 196-198 |
| F | 6-Cl | 8-Cl | 221-222.5 |
| F | 6-Br | 8-Br | 260-262 |
| F | 6-I | 8-I | 316-318 |
| F | 5-Cl | 7-Cl | 249-251 |
| F | 5-Cl | 8-Cl | 261-262 |
| CF₃ | 6-Cl | 8-Cl | 227-228 |
| F | H | 6-Cl | 253-254 |
| F | 6-Cl | 7-Cl | 224-226 |
| F | H | 6-F | 245-246 |
| F | 7-Cl | 8-Cl | 275-276 |
| F | H | 8-Cl | 250-252 |
| CF₃ | H | 6-Cl | 244-246 |
| F | H | 6-I | 272-273 |
| F | H | 8-I | 274-276 |
| F | 6-Br | 8-CF₃ | 212-214 |
| F | 6-Br | 7-Cl | 225-227 |
| F | 6-Cl | 8-Br | 239 |
| F | 6-Cl | 8-CH₃ | 248 |
| F | 6-Br | 8-Cl | 246-247 |
| F | 6-Cl | 8-CH₃O | 282 |
| F | H | 7-CH₃ | 253-254 |
| CF₃ | H | 7-CH₃ | 215-216 |
| F | 6-Br | 8-Br | 260-262 |
| F | 6-Cl | 8-CF₃ | 189-190 |
| CF₃ | 6-Br | H | 244-248 |
| CF₃ | 6-Br | 7-Cl | 236-238 |
| CF₃ | 6-Cl | 8-CF₃ | 176 |
| CF₃ | H | 6-I | 226-228 |
| CF₃ | H | 8-I | 230-232 |

EXAMPLE 2

2-Perfluoroethyl-4-(3H)-quinazolinone (I: R = CF₃; R₁, R₂ = H).

To an ice cold solution of 25 g. (0.182 mole) of anthranilamide and 10.8 g. (0.138 mole) of pyridine in 200 ml. of dry tetrahydrofuran is added slowly 37.5 g. (0.21 mole) of perfluoropropionyl chloride. The resulting slurry is filtered and the filtrates evaporated to dryness to give 2-perfluoropropionamidobenzamide, which is triturated with 1N HCl to give 47.5 g. of an off-white solid metling at 141°–144° C. After drying briefly, the solid is heated to 150°-165° C. for 1.5 hours and then allowed to cool to room temperature. The resulting product is dissolved in 50 ml. of 1N sodium hydroxide, filtered, and the filtrate acidified to give 35.8 g. (79 percent) of the desired compound as an off-white solid, m.p. 200°–203° C. This solid is recrystallized from chloroform to give 31.0 g. (68 percent) of a colorless solid, m.p. 201°–203° C.

Anal. Calc'd for C₁₀H₅F₅N₂O: C, 45.5; H, 1.9; N, 10.6
Found: C, 45.3; H, 1.9; N, 10.8.

Starting with the appropriate acid chloride and anthranilamide, and employing the above procedure, the following quinazolinones are synthesized: 2-trifluoromethyl-4(3H)-quinazolinone, m.p. 242°–244° C.; 2-perfluoropropyl-4(3H)-quinazolinone, m.p. 158°–160° C.; 2-trifluoromethyl-6-nitro-4(3H)-quinazolinone, m.p. 238°–240° C; 2-perfluoroethyl-6-nitro-4(3H)-quinazolinone, m.p. 209°–211° C.; 2-perfluoropropyl-6-nitro-4(3H)-quinazolinone, m.p. 177°–179° C.; and 2-perfluoroethyl-6-nitro-8-trifluoromethyl-4(3H)-quinazolinone, m.p. 214°–215° C.

EXAMPLE 3

Employing the indicated procedure, and starting with the requisite reagents, the following quinazolinones are prepared:

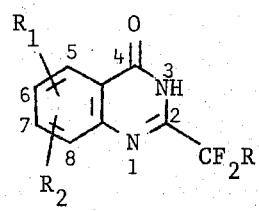

| R | R₁ | R₂ | Procedure |
|---|----|----|-----------|
| n-C₃F₇ | 6-Cl | 7-Cl | Example 1 |
| n-C₃F₇ | H | 7-Cl | Example 1 |
| n-C₃F₇ | H | 8-Br | Example 1 |
| C₂F₅ | 6-F | 8-F | Example 1 |
| n-C₄F₉ | H | 6-I | Example 1 |
| CF₃ | 6-CH₃ | 8-NO₂ | Example 1 |
| n-C₃F₇ | 6-Cl | 8-CF₃ | Example 2 |
| C₂F₅ | H | 6-Br | Example 2 |
| C₂F₅ | H | 6-NO₂ | Example 2 |
| C₂F₅ | 7-CH₃ | 8-Cl | Example 1 |
| n-C₄F₉ | 7-CH₃ | 8-Br | Example 1 |
| CF₃ | 6-CH₃ | 8-Cl | Example 1 |
| F | 6-CH₃ | 8-Br | Example 1 |

EXAMPLE 4

2-Trifluoromethyl-6,8-dichloro-4(3H)-quinazolinone
(R = F; R₁ = 6-Cl; R₂ = 8-Cl)

To a cooled solution of 25 g. (0.122 mole) of 3,5-dichloroanthranilamide in 500 ml. of ethyl acetate in added dropwise over a period of 15 minutes 28.2 g. (0.135 mole) of trifluoroacetic anhydride in 30 ml. of ethyl acetate. The solution is stirred at room temperature for an additional 10 minutes and then the excess anhydride, trifluoroacetic acid and ethyl acetate are removed in vacuo. The resulting white solid is dissolved in a 1N sodium hydroxide solution at 60°–70° C. The solution is then cooled and filtered, and the filtrate acidified. The resulting precipitate is filtered and dried to give 32.6 g. (94.5 percent yield) of a colorless solid melting at 218°–220° C. The product is identical to that formed by the process of Example 1.

EXAMPLE 5

2-Difluorochloromethyl-4(3H)-quinazolinone (I: R = Cl; R₁, R₂ = H)

To a suspension of 80 ml. of tetrahydrofuran containing 10.0 g. (0.0735 mole) of anthranilamide and cooled to 0° C. in an ice-salt bath is added 4.4 g. of pyridine followed by 10.9 g. (0.0735 mole) of difluorochloroacetyl chloride over a period of 1.5 hours. After this time an additional 2.0 g. of the acid chloride is added and the suspended solids filtered. The filtrate is concentrated to dryness, triturated with 1N HCl and filtered, m.p. 140°–144° C. Five grams of the dried intermediate is heated to 150° C. for 1 hour and then dissolved in 1N NaOH. The insolubles are filtered and the product precipitated from the filtrate by the addition of 12N HCl, m.p. 241°–244° C. Recrystallization from ethanol-water provides the pure product, 3.0 g., m.p. 243°–244° C.

By a similar procedure the 2-difluorochloromethyl-4(3H)-quinazolinones below are also prepared: 2-difluorochloromethyl-6-chloro-4(3H)-quinazolinone, m.p. 260°–262° C.; 2-difluorochloromethyl-6-bromo-4(3H)-quinazolinone, m.p. 264°–265° C.; 2-difluorochloromethyl-7-chloro-4(3H)-quinazolinone, m.p. 206°–208° C.; 2-difluorochloromethyl-6-nitro-4(3H)-quinazolinone, m.p. 238°–239° C.; and 2-difluorochloromethyl-6,8-dichloro-4(3H)-quinazolinone, m.p. 215°–216° C.

EXAMPLE 6

2-Difluorochloromethyl-6-bromo-8-trifluoromethyl-4(3H)-quinazolinone (I: R = Cl; $R_1$ = 6–Br; $R_2$ = 8–$CF_3$)

A cooled suspension of 7.0 g. (0.025 mole) of 3-trifluoromethyl-5-bromoanthranilic acid in 75 ml. of chloroform is treated with 3.9 g. (0.05 mole) of pyridine and the resulting solution maintained below 10° C. while 7.4 g. (0.05 mole) of chlorodifluoroacetyl chloride is added dropwise. The reaction mixture is allowed to warm to room temperature, and is then heated to reflux for 3 hours. The mixture is cooled in an ice bath, saturated with ammonia gas, and finally evaporated to dryness. Trituration of the residue with 1N hydrochloric acid solution provides, after filtration and drying, 8.35 g., m.p. 155°–160° C. of the crude product. The crude material is dissolved in 75 ml. of 1N sodium hydroxide solution, the insolubles filtered, and the product precipitated with 6N hydrochloric acid and recrystallized from benzene-hexane, 2.09 g., m.p. 188°–189° C.

Replacing the above-mentioned anthranilic acid with 3-trifluoromethyl-5-chloroanthranilic acid in the above procedure provides 2-difluorochloromethyl-6-chloro-8-trifluoromethyl-4(3H)-quinazolinone, m.p. 170° C.

EXAMPLE 7

Starting with the appropriate anthranilamide and chlorodifluoroacetyl chloride, and employing the procedure of Example 5, the following congeners are synthesized:

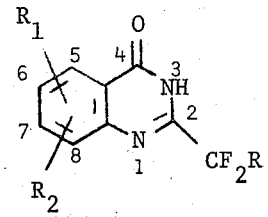

| R | $R_1$ | $R_2$ |
|---|---|---|
| Cl | 6-Cl | 7-Cl |
| Cl | 6-Cl | 7-Br |
| Cl | 6-Cl | 7-F |
| Cl | 6-Br | 7-F |
| Cl | 6-F | 7-Cl |
| Cl | 6-F | 7-F |
| Cl | 7-Cl | 8-Cl |
| Cl | H | 8-F |
| Cl | H | 6-I |
| Cl | 7-$CH_3$ | 8-Cl |
| Cl | 7-$CH_3$ | H |
| Cl | 6-$CH_3$ | 8-Cl |
| Cl | 6-$CH_3$ | 8-Br |
| Cl | 6-$CF_3$ | 7-Cl |
| Cl | 7-F | 6-$NO_2$ |
| Cl | 6-$CH_3$ | 8-$NO_2$ |

EXAMPLE 8

2-Difluoromethyl-4(3H)-quinazolinone (I: R = H; $R_1$, $R_2$ = H)

A mixture of 10 g. (0.073 mole) of anthranilamide and 10 g. (0.104 mole) of difluoroacetic acid is heated to reflux overnight. The excess acid is removed by distillation and the residual intermediate is heated at 200° C. for one hour. Upon cooling, the reaction mixture is dissolved in 1N sodium hydroxide solution and filtered from a small amount of insolubles. Acidification of the filtrate with 12N hydrochloric acid, followed by filtration of the precipitated product and subsequent recrystallization from ethanol provides 10 g. of the desired product, m.p. 214°–217° C.

Starting with the appropriately substituted anthranilamide and difluoroacetic acid, and repeating the above procedure, the following analogs are synthesized:

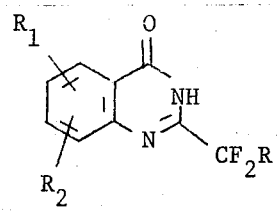

| R | $R_1$ | $R_2$ | M.P., °C. |
|---|---|---|---|
| H | H | 6-Cl | 208–209 |
| H | H | 6-Br | 216–217 |
| H | H | 7-Cl | 247–249 |
| H | H | 6-$NO_2$ | 240–242 |
| H | 6-Cl | 8-Cl | 240–241 |
| H | 6-Br | 8-Br | 265–266 |
| H | 6-Cl | 8-$CF_3$ | 178–180 |

EXAMPLE 9

Again, the procedure of Example 8 is repeated, employing the requisite anthranilamide and difluoroacetic acid, to provide the following compounds: 2-difluoromethyl-6-fluoro-4(3H)-quinazolinone, 2-difluoromethyl-7-fluoro-4(3H)-quinazolinone, 2-difluoromethyl-6-iodo-4(3H)-quinazolinone, 2-difluoromethyl-6-fluoro-8-trifluoromethyl-4(3H)-quinazolinone, 2-difluoromethyl-6-chloro-8-bromo-4(3H)-quinazolinone, 2-difluoromethyl-7-methylthio-4(3H)-quinazolinone, 2-difluoromethyl-6-methylthio-7-chloro-4(3H)-quinazolinone, 2-difluoromethyl-6-nitro-5-methylthio-4(3H)-quinazolinone, 2-difluoromethyl-6-methylthio-7-bromo-4(3H)-quinazolinone, 2-difluoromethyl-6-nitro-8-methylthio-4(3H)-quinazolinone and 2-difluoromethyl-6,8-difluoro-4(3H)-quinazolinone.

EXAMPLE 10

2-(2-Chloro-1,1,2-trifluoroethyl)-4(3H)-quinazolinone (I: R = CHClF; $R_1$, $R_2$ = H)

A mixture of 5.44 g. (0.04 mole) of anthranilamide and 10.0 g. (0.061 mole) of 3-chloro-2,2,3-trifluoropropionic acid is heated with an oil bath. At 120° C. the liquified mixture sets-up solid, and reliquifies at a bath temperature of about 138° C. Heating is continued for an additional 3–4 hours at 150°–160° C., at which time a solid commences to precipitate from the solution. The cooled reaction mixture is slurried several times with benzene, and the combined benzene layers concentrated in vacuo to an oily solid, which on trituration with ethyl ether gives 3.0 g. of the desired product in two crops, m.p. 187°–188°C. and 185°–186°C. The analytical sample is recrystallized from hexane-acetone.

Anal. Calc'd for $C_{10}H_6N_2OClF_3$: C, 45.7; H, 2.3; N, 10.7.
Found: C, 46.2; H, 2.4; N, 11.4.

Repeating the above procedure and starting with the requisite anthranilamide the following products are formed: 2-(2-chloro-1,1,2-trifluoroethyl)-6-chloro-4(3H)-quinazolinone, m.p. 201°–202° C.; 2-(2-chloro-1,1,2-trifluoroethyl)-7-chloro-4(3H)-quinazolinone, m.p. 188°–189° C.; 2-(2-chloro-1,1,2-trifluoroethyl)-6,8-dichloro-4(3H)-quinazolinone, m.p. 166°–167° C.; and 2-(2-chloro-1,1,2-trifluoroethyl)-6-nitro-4(3H)-quinazolinone, m.p. 212°–214° C.

EXAMPLE 11

2-(1,1,2,2-Tetrafluoroethyl)-4(3H)-quinazolinone (I: R = $CHF_2$; $R_1$, $R_2$ = H)

In a manner similar to Example 10, 6.80 g. (0.05 mole) of anthranilamide and 8.76 g. (0.06 mole) of 2,2,3,3-tetrafluoropropionic acid are heated together in an oil bath to the reflux temperature (148° C.), and maintained at this temperature for 5 hours. The reaction mixture is cooled, and the flask contents recrystallized from benzene, 3.8 g. The crude product is dissolved in 1N sodium hydroxide, filtered from some insolubles, and the filtrate acidified with hydrochloric acid. The precipitated product, 2.5 g., m.p. 190°–192° C. is purified by recrystallization from cyclohexane.

Anal. Calc'd for $C_{10}H_8N_2OF_4$: C, 48.8; H, 2.5; N, 11.4.
Found: C, 49.8; H, 2.6; N, 11.7.

By employing 5-chloroanthranilamide in place of anthranilamide in the above procedure, 2-(1,1,2,2-tetrafluoroethyl)-6-chloro-4(3H)-quinazolinone is prepared, m.p. 218°–219° C.

EXAMPLE 12

The experimental procedure of Example 11 is again repeated, starting with the appropriate anthranilamide and propionic acid, to prepare the following compounds:

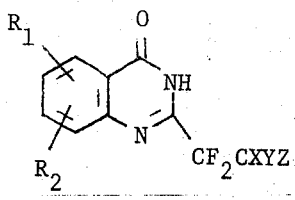

| $R_1$ | $R_2$ | X | Y | Z |
|---|---|---|---|---|
| H | 6-Br | H | H | H |
| H | 7-Cl | H | H | H |
| H | 6-I | H | H | H |
| H | 6-I | H | H | F |
| 6-Cl | 8-Cl | H | H | F |
| H | 6-F | H | H | F |
| 6-Br | 8-$CF_3$ | H | H | H |
| H | 6-$NO_2$ | H | H | H |
| H | 7-$CH_3$ | H | H | F |
| 6-$CH_3$ | 8-Cl | H | H | F |
| H | H | H | H | F |
| H | H | H | H | H |
| 6-$CH_3$ | 8-$NO_2$ | H | H | F |
| H | H | H | H | Cl |
| 5-Cl | 8-Cl | H | H | Cl |
| 6-Br | 8-Br | H | H | Cl |
| H | 8-I | H | H | Cl |
| H | 7-$CH_3$ | H | Cl | Cl |
| 6-$CH_3$ | 8-Cl | H | Cl | Cl |
| 6-Br | 8-Cl | H | Cl | Cl |
| 6-Cl | 8-Cl | Cl | Cl | Cl |
| H | 6-$NO_2$ | Cl | Cl | Cl |
| 6-$NO_2$ | 7-F | Cl | Cl | Cl |
| H | 6-F | Cl | Cl | Cl |
| 6-Br | 8-$CF_3$ | Cl | F | Cl |
| H | H | Cl | F | Cl |
| H | 7-Cl | Cl | F | Cl |
| H | 8-I | Cl | F | Cl |
| 6-Cl | 8-Cl | F | F | Cl |
| H | 7-$CH_3$ | F | F | Cl |
| 6-Cl | 8-$NO_2$ | F | F | Cl |
| H | 7-$CH_3$ | H | Cl | F |
| 6-$CH_3$ | 8-Cl | H | Cl | F |
| H | 6-I | H | Cl | F |
| H | 7-Cl | H | Cl | F |
| 6-Br | 8-$CF_3$ | H | F | F |
| H | H | H | F | F |
| 6-Cl | 8-Cl | H | F | F |

EXAMPLE 13

2-Trifluoromethyl-7-methyl-4(3H)-quinazolinone (I: R = F; $R_1$ = H; $R_2$ = $CH_3$)

To 5.0 g. (0.033 mole) of 4-methylanthranilic acid in 75 ml. of ethyl acetate is added dropwise with cooling 21 g. (0.099 mole) of trifluoroacetic anhydride. The reaction mixture is allowed to warm to room temperature and remain for several days. The mixture is evaporated to dryness and the residue treated with acetonitrile saturated with ammonia gas. After several hours the mixture is evaporated in vacuo, the residue treated with 1N sodium hydroxide and filtered. Acidification of the filtrate with 6N hydrochloric acid precipitates the crude product which on recrystallization from ethanol provides 1.6 g., m.p. 253°–254° C., of the desired product.

In a similar manner are prepared 2-trifluoromethyl-6,7-dimethyl-4(3H)-quinazolinone, m.p. 269°–270° C.; 2-trifluoromethyl-6-chloro-8-methyl-4(3H)-quinazolinone, m.p. 248° C.; 2-perfluoroethyl-7-methyl-4(3H)-quinazolinone, m.p. 278°–279° C.; 2-trifluoromethyl-6,8-dimethyl-4(3H)-quinazolinone, m.p. 244° C.; 2-trifluoromethyl-6-methyl-4(3H)-quinazolinone, m.p. 228° C.; and 2-trifluoromethyl-8-methyl-4(3H)-quinazolinone, m.p. 228°–229° C.

EXAMPLE 14

2-Trifluoromethyl-4(3H)-quinazolinethione (II: $R_1$, $R_2$ = H)

To a solution of 21.3 g. (0.1 mole) of 2-trifluoromethyl-4(3H)-quinazolinone and 100 ml. of pyridine at reflux temperature is added slowly 22.2 g. (0.1 mole) of phosphorous pentasulfide. The solution is kept at the reflux temperature for 72 hours. The pyridine is then evaporated and the residue diluted with 100 g. of crushed ice. The resultant slurry is warmed on a steam bath for 2 hours, cooled, made basic with 1N sodium hydroxide and filtered. The filtrate is then acidified and the resulting solid collected by filtration. Recrystallization from aqueous methanol gives 20.0 g. of the desired product, m.p. 216°–219° C. A second recrystallization from methanol gives 6.9 g. of analytically pure material melting at 217°–219° C.

Similarly, starting with 2-trifluoromethyl-6,8-dichloro-4(3H)-quinazolinone and repeating this procedure provides 2-trifluoromethyl-6,8-dichloro-4(3H)-quinazolinethione, m.p. 200°–203° C.

EXAMPLE 15

The procedure of Example 14 is repeated, starting with the requisite 2-trifluoromethyl-4(3H)- quinazolinone, to provide the following compounds:

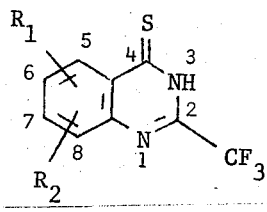

| $R_1$ | $R_2$ | $R_1$ | $R_2$ |
|---|---|---|---|
| H | 7-$NO_2$ | H | 7-Cl |
| 6-Br | 8-Br | 6-I | 8-I |
| 5-Cl | 7-Cl | 5-Cl | 8-Cl |
| H | 6-Cl | 6-Cl | 7-Cl |
| H | 7-F | 7-Cl | 8-Cl |
| H | 8-Cl | H | 6-I |
| 6-Br | 8-$CF_3$ | 6-Br | 7-Cl |
| 6-Cl | 8-Br | 6-Br | 8-Cl |
| 6-Cl | 8-$CF_3$ | H | H |
| H | 6-$NO_2$ | | |

EXAMPLE 16

2-Trifluoromethyl-6,8-dichloro-4(3H)-quinazolinone Sodium Salt

A suspension of 4.46 g. (0.158 mole) of 2-trifluoromethyl-6,8-dichloro-4(3H)-quinazolinone in 50–60 ml. of water is stirred rapidly while sufficient 0.5 N sodium hydroxide is added to provide a solution of pH 8.5. A small amount of particulate matter is filtered and the filtrate evaporated to dryness under reduced pressure. The residual white solid is triturated with chloroform, filtered and oven dried at 45° C., 4.6 g., m.p. 365° C.

In a similar manner, the sodium, potassium and lithium salts of the compounds in Examples 1–3, 5–12 and 14–15 are prepared by dissolving approximately 0.01 mole of these compounds in aqueous solutions containing equivalent amounts of sodium hydroxide, potassium hydroxide, and lithium hydroxide, respectively, followed by lyophilization of the resultant mixtures.

EXAMPLE 17

2-Trifluoromethyl-6,8-dichloro-4(3H)-quinazolinone n-Octylamine Salt

To a solution of 710 mg. (2.5 m moles) of 2-trifluoromethyl-6,8-dichloro-4(3H)-quinazolinone in 20 ml. of methanol is added 320 mg. (2.5 m moles) of n-octylamine, and the solution allowed to stir for 15–20 minutes. Removal of the solvent in vacuo provides the desired salt such as an oil, which crystallizes on standing, 1.01 g., m.p. 100°–101° C.

By a similar procedure, starting with the appropriate primary amine, the congeners of Examples 1–3, 5–12 and 14–15 are converted to their primary amine salts.

EXAMPLE 18

2-Trifluoromethyl-6,8-dichloro-4(3H)-quinazolinone, N,N-dimethyl-n-dodecylamine salt To 20 ml. of methanol is added 1.0 g. (3.5 m moles) of 2-trifluoromethyl-6,8-dichloro-4(3H)-quinazolinone and 2.5 m moles of N,N-dimethyl-n-dodecylamine, and the reaction mixture allowed to remain at room temperature overnight. The solvent is removed under reduced pressure to provide the desired product as an oil which crystallizes on standing, 1.55 g., m.p. 35°–38° C.

EXAMPLE 19

2-Trifluoromethyl-6,8-dichloro-4(3H)-quinazolinone, N,N-dimethylcyclohexylamine salt In a procedure similar to that of Example 15, 710 mg. (3.5 m moles) of 2-trifluoromethyl-6,8-dichloro-4(3H)-quinazolinone and 320 mg. (2.5 m moles) of N,N-dimethylcyclohexylamine yielded 900 mg. of the desired salt, m.p. 162°–163° C. By repeating the procedure of Example 17 with the products of Examples 1–3, 5–12 and 14–15, and the appropriate tertiary amine, the corresponding tertiary amine salts are formed.

EXAMPLE 20

2-Trifluoromethyl-6,8-dichloro-4(3H)-quinazolinone, N-methyldodecylamine salt

By a procedure similar to Example 17, equimolar amounts of 2-trifluoromethyl-6,8-dichloro-4(3H)-quinazolinone and N-methyldodecylamine yield the desired salt as a low melting solid.

Similarly, the compounds of Examples 1–3, 5–12 and 14–15, when combined with the requisite secondary amines, form the corresponding amine salts.

EXAMPLE 21

The insecticidal activity of typical representatives of the compounds of the present invention are set forth below together with test procedures.

TEST PROCEDURES

A. Animal Ectoparasites (Housefly/Blowfly)

Using, in order of preference, acetone, ethanol or methyl ethyl ketone a solution of the test compound is made up at a concentration of 1 mg./ml. and used for this test.

The test solution (0.5 ml.) is pipetted evenly on to No. 1 filter paper (8 × 6.25 cm.) to give a deposit of 100 mg./m². When dry, the paper is rolled and slid into a test-tube to which is added 1.5 ml. of calf serum which is absorbed by the filter paper and serves as food. Fifteen *Lucilia sericata* larvae, approximately 36 hours old, are introduced and the tube closed with a cotton wool plug and stored with the top part only in a strong light to keep the larvae in the lower part of the tube and thus in contact with the filter paper. The insects are maintained for 24 hours, and mortalities noted and recorded as a percentage after correction for any mortality among the controls. Fifteen larvae confined with untreated filter paper serve as controls.

The results of the above described test employing compounds of the present invention are shown in Table I.

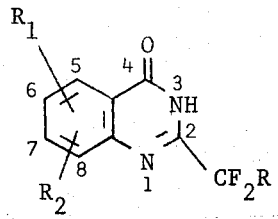

TABLE I

| R | R₁ | R₂ | % Kill Against Blowfly larvae mg./m² | | | |
|---|---|---|---|---|---|---|
| | | | 100 | 50 | 25 | 12.5 |
| F | 6-Cl | 8-CF₃ | 100 | 100 | 100 | 72 |
| Cl | 6-Cl | 8-CF₃ | 100 | 100 | 98 | 49 |
| Cl | 6-Br | 8-CF₃ | 100 | 100 | 100 | 47 |
| CF₃ | 6-Cl | 8-Cl | 100 | 100 | 66 | 23 |
| F | 6-Cl | 8-Cl | 100 | 100 | 98 | 20 |
| F | 6-Br | 8-Br | 100 | 100 | 96 | 9 |

B. Insecticidal Microscreen

Representative compounds are formulated as solutions, emulsions or wettable powders with proper wetting agents. Foliar portions of host plants of Mexican Bean Beetle (*E. varivestis*) (MBB) larvae and Southern Armyworm (*P. eridania*) (SAW) larvae are treated with appropriate concentrations of candidate compounds and allowed to air dry. Representative treated leaves are excised and placed in petri dishes containing moistened filter paper. Test larvae are transferred to respective petri dishes, covers affixed and helf for observation.

Host plants are infested with mixed life stages of Two-Spotted Spider Mite (*T. urticae*) (2SSM) 24 hours prior to test. Leaves of uniform size and mite population (25–50 mites per leaf) are excised, treated with respective candidate compounds and transferred to holding units equipped with individual moisture sources. Observations for contact mortality are generally made 72 hours after treatment. Ovicidal activity is observed seven days after treatment.

Standard "in vitro" procedures are used for detection of toxicity to Mosquite larvae (*Aedes aegypti*) (MOSL). Aqueous formulations of the compounds at predetermined concentrations are placed in vials and larvae introduced. Mortality and growth regulant characteristics are observed.

The mortality for the various insect species mentioned above at the indicated dose level (ppm) for the representative compounds are shown in Table II.

TABLE II

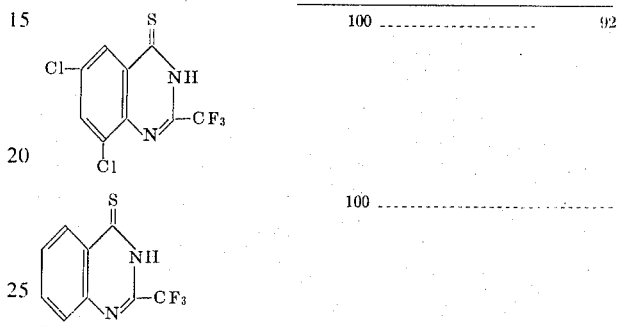

| R | R₁ | R₂ | 10 p.p.m. MOSL | 500 p.p.m. MBB | 500 p.p.m. SAW | 500 p.p.m. 2SSM |
|---|---|---|---|---|---|---|
| F | H | 7-Cl | 40 | | | 97 |
| F | 6-Cl | 8-Cl | | | 20 | |
| F | 6-Br | 8-Br | 100 | | | 20 |
| F | 5-Cl | 7-Cl | 100 | 20 | | 100 |
| F | 5-Cl | 8-Cl | 100 | | | 83 |
| CF₃ | 6-Cl | 8-Cl | 100 | | 100 | 92 |
| F | H | 6-Cl | | | | 97 |
| F | 7-Cl | 8-Cl | 100 | | | 100 |
| CF₃ | H | 6-NO₂ | | 20 | | 30 |
| F | H | 8-Cl | 100 | 40 | | |
| CF₃ | H | 6-Cl | 100 | | | |
| F | H | 6-Br | 100 | | | 90 |
| F | H | 6-I | 100 | 20 | | 70 |
| CF₃ | H | 6-I | 100 | | | |
| F | 6-Br | 8-NO₂ | 100 | 60 | | 50 |
| CF₃ | 6-Br | H | 100 | | | 93 |
| F | 8-CF₃ | H | 75 | | | 100 |
| F | 8-CF₃ | 6-Cl | 100 | 40 | 100 | 100 |
| F | 8-CF₃ | 6-NO₂ | 100 | | | |
| F | H | 8-I | 100 | | | |
| CF₃ | H | 8-I | 100 | 20 | | |

| R | R₁ | R₂ | 1 p.p.m. MOSL | 500 p.p.m. MBB | 500 p.p.m. SAW | 500 p.p.m. 2SSM |
|---|---|---|---|---|---|---|
| Cl | 8-CF₃ | 6-Cl | 100 | 60 | 80 | 100 |
| CF₃ | 8-CF₃ | 6-Cl | 100 | 40 | 100 | 100 |
| Cl | 8-CF₃ | 6-Br | 100 | 20 | 100 | 80 |
| Cl | 6-Cl | H | | | 20 | |
| Cl | 6-Cl | 8-Cl | 100 | 0 | 80 | 100 |
| CF₃ | H | 7-Cl | 0 | 40 | 0 | 0 |
| Cl | 6-Br | H | | 40 | | 50 |
| H | 8-CF₃ | 6-Cl | | 60 | | 100 |

| R | R₁ | R₂ | 2 p.p.m. MOSL | 500 p.p.m. MBB | 500 p.p.m. SAW | 500 p.p.m. 2SSM |
|---|---|---|---|---|---|---|
| F | 6-Br | 7-Cl | | | 80 | 90 |
| F | 6-Cl | 8-Br | | 40 | | 90 |

| 10 p.p.m. | 500 p.p.m. | 500 p.p.m. | 500 p.p.m. |
|---|---|---|---|
| 100 | | | 92 |

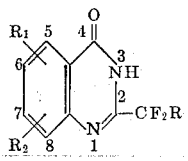

100

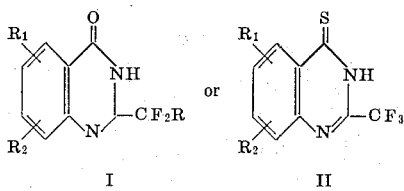

What is claimed is:

1. A method of killing insects which comprises contacting said insects with an insecticidally effective amount of a compound of the formula $$\underset{I}{\begin{array}{c}R_1 \\ \diagup\!\!\!\diagdown \\ R_2\end{array}\!\!\!\!\begin{array}{c}O \\ \parallel \\ C \\ NH \\ N\!\!-\!\!CF_2R\end{array}} \quad \text{or} \quad \underset{II}{\begin{array}{c}R_1 \\ \diagup\!\!\!\diagdown \\ R_2\end{array}\!\!\!\!\begin{array}{c}S \\ \parallel \\ C \\ NH \\ N\!\!-\!\!CF_3\end{array}}$$

or a salt thereof selected from the group consisting of the alkali metal, mono-alkylamine, dialkylamine and trialkylamine salt, wherein said alkyl contains from 1 to 12 carbon atoms, and wherein:

R is selected from the group consisting of H, F, Cl, perfluoroalkyl containing from 2 to 4 carbon atoms and —CXYZ wherein X, Y and Z are each selected from the group consisting of H, F and Cl;

R₁ is selected from the group consisting of H, F, Cl, Br, I and CF₃; and

R₂ is selected from the group consisting of H, F, Cl, Br, I and NO₂.

2. The method of claim 1, formula I, wherein R₁ is selected from the group consisting of H, F, Cl, Br, I and CF₃ and R₂ is 6-Cl.

3. The method of claim 2 wherein R is F and R₁ is 8-CF₃.

4. The method of claim 2 wherein R is Cl and R₁ is 8-CF₃.

5. The method of claim 2 wherein R is CF₃ and R₁ is 8-Cl.

6. The method of claim 2 wherein R is F and R₁ is 8-Cl.

7. The method of claim 2 wherein R is CF₃ and R₁ is 8-CF₃.

8. The method of claim 1, formula I, wherein R₁ is selected from the group consisting of H, F, Cl, Br, I, and CF₃ and R₂ is 6-Br.

9. The method of claim 8 wherein R is Cl and $R_1$ is 8-$CF_3$.

10. The method of claim 8 wherein R is $CF_3$ and $R_1$ is H.

11. The method of claim 8 wherein R is F and $R_1$ is H.

12. The method of claim 8 wherein R is F and $R_1$ is 8-Br.

13. The method of claim 8 wherein R is $CF_3$ and $R_1$ is 7-Cl.

14. The method of claim 1, formula I, wherein $R_1$ is selected from the group consisting of H, F, Cl, Br, I and $CF_3$ and $R_2$ is 6-$NO_2$.

15. The method of claim 14 wherein R is F and $R_1$ is 8-$CF_3$.

16. The method of claim 14 wherein R is $CF_3$ and $R_1$ is H.

17. The method of claim 1, formula II, wherein $R_1$ is 6-Cl.

18. The method of claim 17 wherein $R_2$ is 8-Cl.

19. The method of claim 1, formula II, wherein $R_1$ is H.

20. The method of claim 19 wherein $R_2$ is H.

* * * * *

UNITED STATES PATENT OFFICE
CERTIFICATE OF CORRECTION

PATENT NO. : 3,843,791
DATED : October 22, 1974
INVENTOR(S) : James W. McFarland It is certified that error appears in the above-identified patent and that said Letters Patent are hereby corrected as shown below:

Col. 14, claim 1, formula I, that portion of the formula reading

" 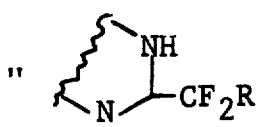 " should read -- 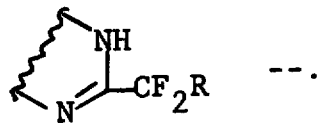 --.

Signed and sealed this 22nd day of April 1975.

(SEAL)
Attest:

RUTH C. MASON
Attesting Officer

C. MARSHALL DANN
Commissioner of Patents
and Trademarks